J. HAINES.
SEED PLANTER.
APPLICATION FILED JUNE 14, 1920.
1,399,475.
Patented Dec. 6, 1921.
3 SHEETS—SHEET 1.
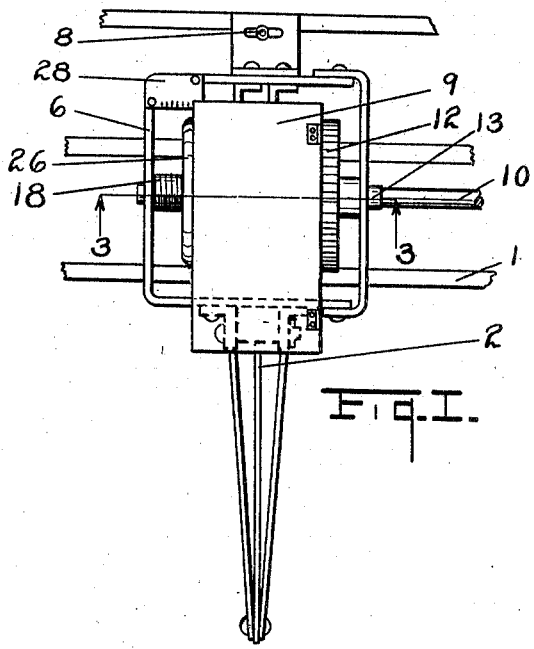
Fig. I.
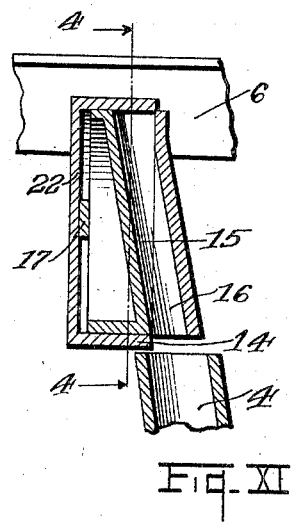
Fig. XI.
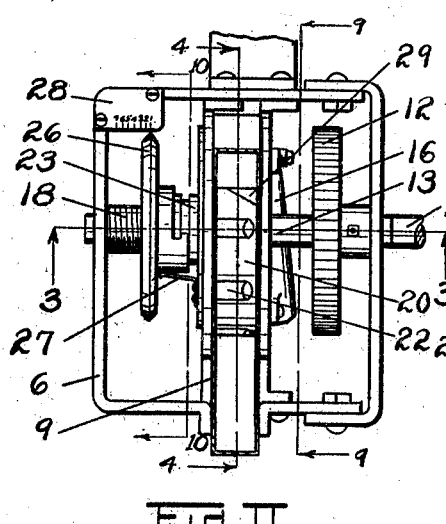
Fig. II.
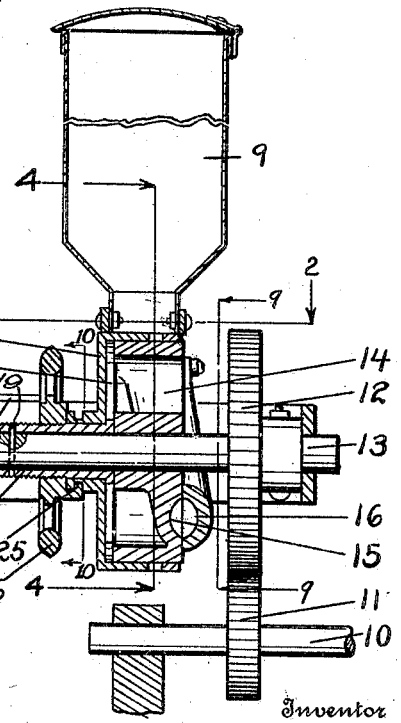
Fig. III.
Inventor
Joseph Haines
Witnesses
Fred Ullrich
M. Louis Thurston
By
Chappell Earl
Attorneys

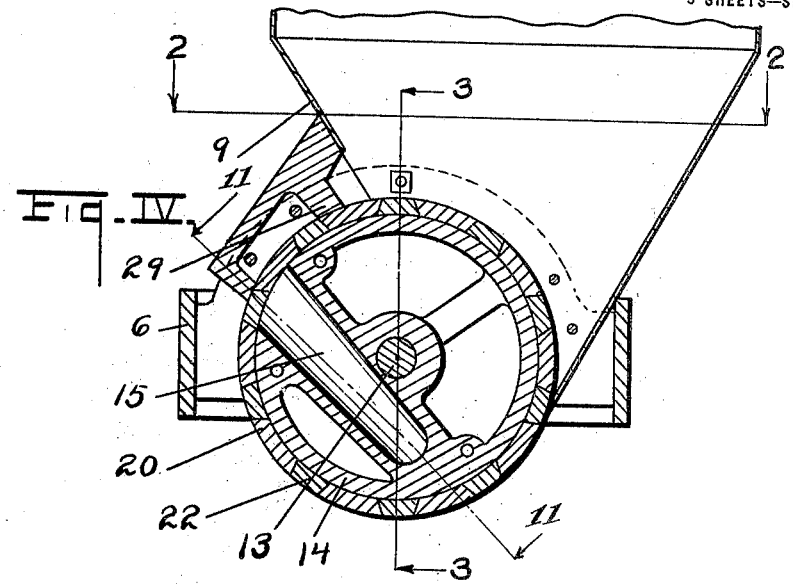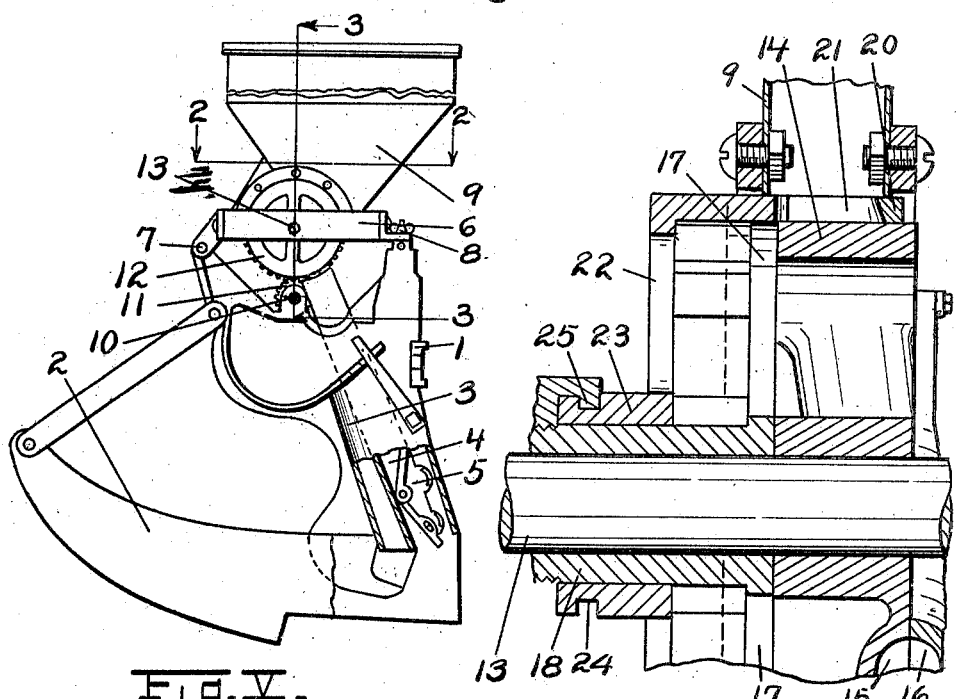

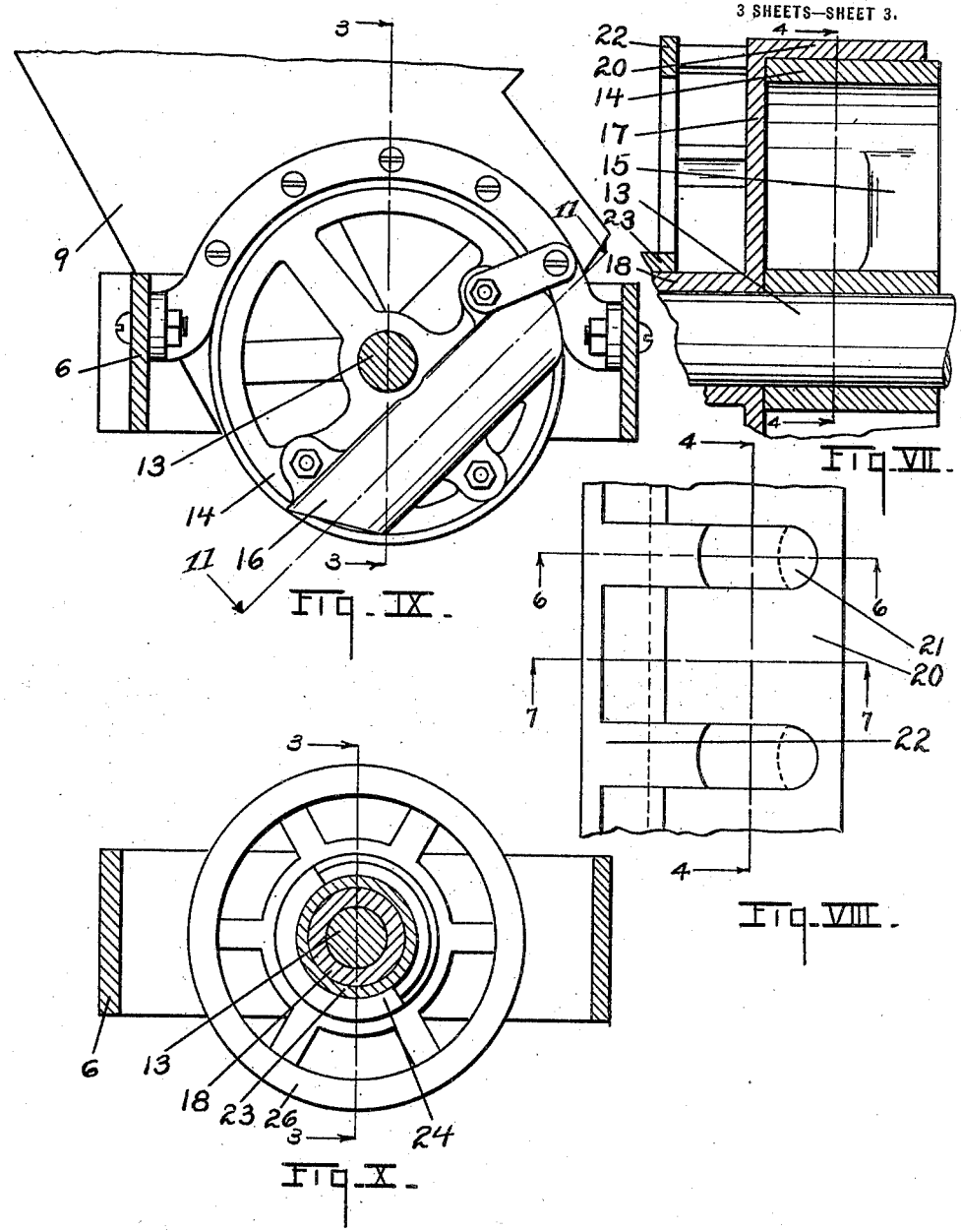

UNITED STATES PATENT OFFICE.

JOSEPH HAINES, OF CLAYPOOL, INDIANA.

SEED-PLANTER.

1,399,475.  Specification of Letters Patent.  Patented Dec. 6, 1921.

Application filed June 14, 1920. Serial No. 388,850.

*To all whom it may concern:*

Be it known that I, JOSEPH HAINES, a citizen of the United States, residing at Claypool, county of Kosciusko, State of Indiana, have invented certain new and useful Improvements in Seed-Planters, of which the following is a specification.

This invention relates to improvements in seed planters.

The main object of this invention is to provide in a seed planter an improved seed feeding or dropping mechanism which may be readily adjusted to vary the quantity of seed delivered. A further object is to provide in a seed planter an improved seed feeding mechanism which is quite simple and very durable in structure.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a detail plan view of a structure embodying the features of my invention, the parts being shown mainly in conventional form.

Fig. II is a detail horizontal section on a line corresponding to line 2—2 of Figs. III, IV and V.

Fig. III is a detail view mainly in vertical section on a line corresponding to line 3—3 of Figs. I, II, IV, V, IX and X.

Fig. IV is an enlarged detail vertical section on a line corresponding to line 4—4 of Figs. II, III, VII and VIII, showing details of the feed mechanism.

Fig. V is a detail side elevation of the parts shown in Fig. I, certain parts being broken away for convenience in illustration.

Fig. VI is an enlarged detail section on a line corresponding to line 6—6 of Fig. VIII, showing details of the feed adjusting means.

Fig. VII is a detail longitudinal section on a line corresponding to line 7—7 of Fig. VIII.

Fig. VIII is a detail plan view of the feed wheel and the feed cup adjusting member.

Fig. IX is a detail section on a line corresponding to line 9—9 of Figs. II and III.

Fig. X is a detail section on a line corresponding to line 10—10 of Figs. II and III.

Fig. XI is a detail section on a line corresponding to line 11—11 of Figs. IV and IX.

In the drawings similar reference characters refer to similar parts throughout the several views and the sectional views are taken looking in the direction of the little arrows at the ends of the section lines.

Referring to the drawing, 1 represents the main frame of the machine. As the structural details form no part of my present invention they are not illustrated herein. 2 represents the furrow opener, and 3 the boot having the seed passage or conduit 4 therein controlled by the dropping gate or valve 5. These details also form no part of my present invention.

The frame 6 is mounted on the boot by means of the pivot 7 and the bolt 8. The hopper 9 is carried by this frame. The driving shaft 10 extends longitudinally below this frame and is provided with a pinion 11 meshing with the gear 12 on the shaft 13, the shaft 13 being carried by the frame 6.

The feed cylinder 14 is relatively fixed, that is, it is non-rotatable and has a delivery passage 15 therein opening at the periphery of the cylinder. The outer wall 16 of this conduit is formed separately from the cylinder, the passage being inclined relative to the vertical plan of the cylinder so that the discharge is at the side of the cylinder. This feed passage delivers to the seed conduit 4 of the boot.

A feed wheel 17 having the sleeve-like hub 18 is arranged on the shaft to rotate therewith, the hub being secured by means of the pin 19. The feed wheel has a rim portion 20 embracing and rotatable upon the feed cylinder 14. This rim 20 has slot-like seed cups 21 therein which are adapted to be brought into register with the delivery passage 15 of the cylinder as the feed wheel revolves.

The size of the cups is regulated by means of the feed cup adjusting member 22 having a hub 23 axially adjusted on the hub 18 of the feed wheel. The hub 23 has a peripheral groove which is engaged by the lug 25 on the adjusting wheel 26 which is threaded for adjustment upon the hub of the feed wheel. A spring 27 is arranged to bear upon the hub of the adjusting wheel 26 so as to retain it in its adjusted positions. An indicia or index plate 28 is mounted on the frame 6 and provided with suitable indicia coacting with the edge of the wheel 26 thereby indicating the position of the cup adjusting member. To adjust the cup it is only necessary to turn the wheel 26 in the desired direction and owing to its being threaded upon the hub 18, it is capable of very accurate adjustment to determine the size of the feed cups.

My improved planter feed mechanism is capable of rapid adjustment so that the quantity of seed dropped may be varied as desired or it may be adjusted to accommodate different kinds of seeds.

The embodiment of my improvements which I have illustrated is especially designed for the planting of corn, although it may be used for planting other grain, it being possible to plant seeds as small as popcorn and also seeds such as beans and the like.

The hopper is formed so that the pockets travel a considerable distance therethrough thus insuring their filling. The brush or wiper 29 is disposed in advance of the seed passage so that it strikes across the seed cups and only such seeds as are within the seed cups are delivered or discharged.

I have illustrated and described my improvements in an embodiment capable of quite general adaptation. However, certain modifications or adaptations might be required to adapt my improvements to particular structures but I believe such adaptations will be apparent to those skilled in the art to which my invention relates and I have therefore not attempted to illustrate or describe the same herein.

Having thus described my invention, what I claim as new and desire to secure by Letters Patent is:

1. In a planter the combination of a hopper having an opening in the bottom thereof, a relatively fixed feed cylinder disposed in said opening and having a feed discharge passage opening at the periphery thereof, a shaft, a feed wheel having an externally threaded hub mounted on said shaft to rotate therewith, said feed wheel being provided with a flange-like rim rotatable upon said cylinder and having axially disposed slot-like seed cups adapted to register with the discharge passage of said feed cylinder as the feed wheel revolves thereon, a feed cup adjusting member provided with a hub having a peripheral groove therein, mounted on said feed wheel hub for axial adjustment thereon and having finger-like cup members disposed to telescope in the cups of said feed wheel, an adjusting wheel for said cup adjusting member threaded upon said feed wheel hub and having a lug engaging said groove in said cup adjusting member hub, and driving means for said shaft.

2. In a planter, the combination of a hopper having an opening in the bottom thereof, a relatively fixed feed cylinder having a discharge passage disposed in said opening and having a feed discharge passage opening at the periphery thereof, a shaft, a feed wheel having an externally threaded hub mounted on said shaft to rotate therewith, said feed wheel being provided with a flange-like rim rotatable upon said cylinder and having axially disposed slot-like seed cups adapted to register with the discharge passage of said feed cylinder as the feed wheel revolves thereon, a feed cup adjusting member mounted on said feed wheel hub for axial adjustment thereon and having finger-like cup members disposed to telescope in the cups of said feed wheel, an adjusting wheel for said cup adjusting member threaded upon said feed wheel hub and operatively associated with said adjusting member, and driving means for said shaft.

3. In a structure of the class described, the combination of a relatively fixed feed cylinder having a feed discharge passage opening at the periphery thereof, a feed wheel having a flange-like rim rotatable upon said cylinder and having axially disposed slot-like seed cups adapted to register with the discharge passage of said feed cylinder as the feed wheel revolves thereon, a feed cup adjusting member mounted for axial adjustment and having finger-like cup members disposed to telescope in the cups of said feed wheel, and an adjusting wheel mounted for threaded adjustment and operatively associated with said adjusting member.

4. In a structure of the class described, the combination of a relatively fixed feed cylinder, a feed wheel having a flange-like rim rotatable upon said cylinder and having axially disposed slot-like seed cups, a feed cup adjusting member mounted for axial adjustment and having finger-like cup members disposed to telescope in the cups of said feed wheel, and an adjusting wheel mounted for threaded adjustment and operatively associated with said adjusting member.

5. In a structure of the class described, the combination of a relatively fixed feed cylinder having a feed discharge passage opening at the periphery thereof, a feed wheel having a flange-like rim rotatable upon said cylinder and having axially disposed slot-like seed cups adapted to register with the discharge passage of said feed cylinder as the feed wheel revolves thereon, a feed cup adjusting member mounted for axial adjustment and having finger-like cup members disposed to telescope in the cups of said feed wheel, and an adjusting means for said adjusting member.

6. In a structure of the class described, the combination of a relatively fixed feed cylinder having a discharge passage, a feed wheel having a flange-like rim rotatable upon said cylinder and having axially disposed slot-like seed cups, a feed cup adjusting member mounted for axial adjustment and having finger-like cup members disposed to telescope in the cups of said feed wheel, and an adjusting means for said adjusting member.

7. In a structure of the class described, the combination of a relatively fixed feed cylinder having a feed discharge passage opening at the periphery thereof, a feed wheel rotatable upon said cylinder and having seed cups adapted to register with the discharge passage of said feed cylinder as the feed wheel revolves thereon, a feed cup adjusting member mounted for axial adjustment and having cup members adjustable in said cups of said feed wheel, and a means for adjusting said adjusting member.

8. In a structure of the class described, the combination of a relatively fixed feed cylinder having a discharge passage, a feed wheel rotatable upon said cylinder and having seed cups, a feed cup adjusting member mounted for axial adjustment and having cup members adjustable in said cups of said feed wheel, and means for adjusting said adjusting member.

In witness whereof I have hereunto set my hand and seal in the presence of two witnesses.

JOSEPH HAINES. [L. S.]

Witnesses:
CHARLES OPLINGER,
W. E. DAVIS.